(12) United States Patent
Miyashita

(10) Patent No.: US 8,908,244 B2
(45) Date of Patent: Dec. 9, 2014

(54) IMAGE PROCESSING APPARATUS AND IMAGE PROCESSING METHOD

(71) Applicant: KYOCERA Document Solutions Inc., Osaka-shi, Osaka (JP)

(72) Inventor: Masaki Miyashita, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/223,326

(22) Filed: Mar. 24, 2014

(65) Prior Publication Data

US 2014/0293382 A1 Oct. 2, 2014

(30) Foreign Application Priority Data

Mar. 26, 2013 (JP) ................................. 2013-065221
Oct. 31, 2013 (JP) ................................. 2013-226600

(51) Int. Cl.
*H04N 1/46* (2006.01)
*H04N 1/40* (2006.01)

(52) U.S. Cl.
CPC ................................ *H04N 1/40012* (2013.01)
USPC ............. 358/505; 358/1.9; 358/2.1; 348/270; 382/164

(58) Field of Classification Search
CPC ............. H04N 1/56; H04N 1/58; H04N 1/60; H04N 1/6072; H04N 2213/006; H04N 5/14; H04N 9/64; G01S 17/36; G01S 17/89; G06K 9/342; G06K 9/4652; G06K 9/6224; G06T 2207/10016; G06T 2207/10028
USPC .......... 358/1.9, 3.06, 532, 537, 2.1, 538, 488; 348/E5.062, E9.037, E13.074, E5.042, 348/222.1, 270, 345, 349, 46, 57; 382/164, 382/173, 300, 106, 225, 162, 190, 275, 137
See application file for complete search history.

(56) References Cited

U.S. PATENT DOCUMENTS

| | | | | |
|---|---|---|---|---|
| 5,031,035 A | * | 7/1991 | Abe | 358/532 |
| 6,642,962 B1 | * | 11/2003 | Lin et al. | 348/252 |
| 6,778,297 B1 | * | 8/2004 | Fujiwara | 358/1.9 |
| 8,049,929 B2 | * | 11/2011 | Loce et al. | 358/3.06 |
| 8,248,664 B2 | * | 8/2012 | Sato | 358/3.26 |
| 2009/0190193 A1 | | 7/2009 | Sato | |

FOREIGN PATENT DOCUMENTS

JP        2009177632 A        8/2009

* cited by examiner

*Primary Examiner* — Negussie Worku
(74) *Attorney, Agent, or Firm* — Alleman Hall McCoy Russell & Tuttle LLP

(57) ABSTRACT

An image processing apparatus includes an achromatization determination portion, an achromatization processing portion, and a line designation portion. If a black pixel is present within a predetermined peripheral range from a target pixel in a sub-scanning direction, the achromatization determination portion determines whether to achromatize the target pixel, on the basis of an attribute of a background determination pixel present in an opposite direction from the target pixel with respect to the black pixel and within a range of a predetermined number of pixels from the black pixel. If no black pixel is present within the predetermined peripheral range from the target pixel in the sub-scanning direction, the achromatization determination portion determines not to achromatize the target pixel. The achromatization processing portion achromatizes the target pixel determined to achromatize by the achromatization determination portion, and does not achromatize the target pixel determined not to achromatize by the achromatization determination portion.

20 Claims, 7 Drawing Sheets

MAIN-SCANNING DIRECTION

IMAGE PROCESSING APPARATUS AND IMAGE PROCESSING METHOD

INCORPORATION BY REFERENCE

This application is based upon and claims the benefit of priority from the corresponding Japanese Patent Application No. 2013-065221 filed on Mar. 26, 2013 and Japanese Patent Application No. 2013-226600 filed on Oct. 31, 2013, the entire contents of which are incorporated herein by reference.

BACKGROUND

The present disclosure relates to an image processing apparatus and an image processing method.

An image processing apparatus achromatizes an edge portion of a character in an image read by a color scanner, thereby eliminating a color shift in a sub-scanning direction.

SUMMARY

An image processing apparatus according to one aspect of the present disclosure includes an achromatization determination portion, an achromatization processing portion, and a line designation portion. The achromatization determination portion is configured to determine whether to achromatize a target pixel in an image. The achromatization processing portion is configured: to achromatize the target pixel that is determined to achromatize by the achromatization determination portion; and not to achromatize the target pixel that is determined not to achromatize by the achromatization determination portion. The line designation portion is configured: to permit achromatization by the achromatization determination portion and the achromatization processing portion for a line within a predetermined partial range in a sub-scanning direction in the image; and not to permit achromatization by the achromatization determination portion and the achromatization processing portion for a line that is out of the partial range in the sub-scanning direction in the image. If a black pixel is present within a predetermined peripheral range from the target pixel in the sub-scanning direction, the achromatization determination portion determines whether to achromatize the target pixel, on the basis of an attribute of a background determination pixel that is present in an opposite direction from the target pixel with respect to the black pixel and within a range of a predetermined number of pixels from the black pixel. If no black pixel is present within the predetermined peripheral range from the target pixel in the sub-scanning direction, the achromatization determination portion determines not to achromatize the target pixel.

An image processing method according to another aspect of the present disclosure includes a first step, a second step, and a third step. The first step is a step of determining whether to achromatize a target pixel in an image. The second step is a step of achromatizing the target pixel that is determined to achromatize in the first step and not achromatizing the target pixel that is determined not to achromatize in the first step. The third step is a step of permitting achromatization in the first step and the second step for a line within a predetermined partial range in a sub-scanning direction in the image and not permitting achromatization in the first step and the second step for a line that is out of the partial range in the sub-scanning direction in the image. The first step includes a step of, if a black pixel is present within a predetermined peripheral range from the target pixel in the sub-scanning direction, determining whether to achromatize the target pixel, on the basis of an attribute of a background determination pixel that is present in an opposite direction from the target pixel with respect to the black pixel and within a range of a predetermined number of pixels from the black pixel. If no black pixel is present within the predetermined peripheral range from the target pixel in the sub-scanning direction, it is determined in the first step not to achromatize the target pixel.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings.

Embodiment 1

Figure 1:
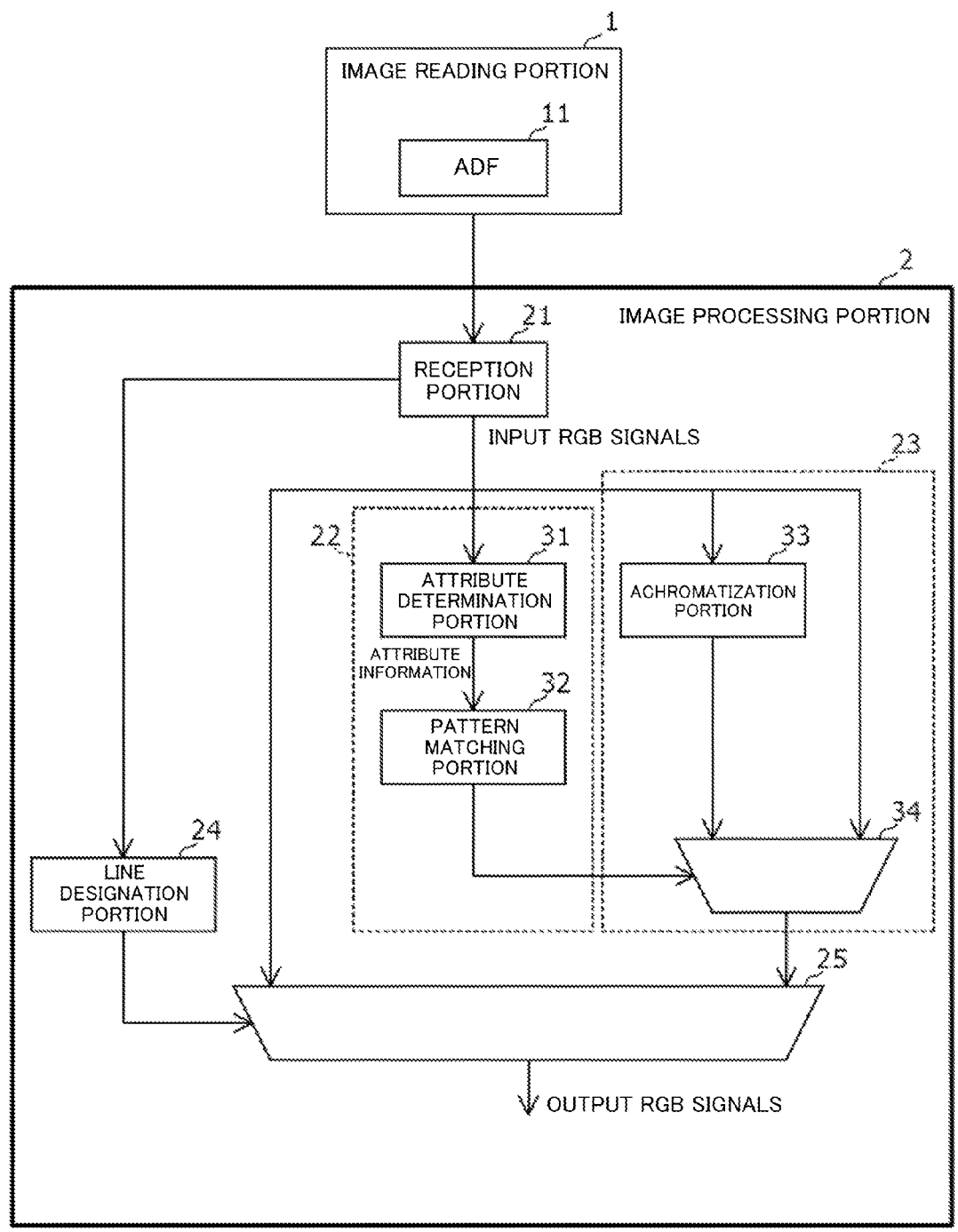
FIG. 1 is a block diagram showing the configuration of an image processing apparatus according to Embodiment 1 of the present disclosure.

FIG. 1 is a block diagram showing the configuration of an image processing apparatus according to Embodiment 1 of the present disclosure. The image processing apparatus shown in FIG. 1 includes an image reading portion 1 and an image processing portion 2.

While automatically conveying a document by using an automatic document feeder (ADF) 11, the image reading portion 1 reads a document image from the document by using respective line sensors for R, G, and B, and outputs RGB signals.

With an image reading device such as a scanner which reads an image of each color by using a line sensor for each color of R, G, and B (red, green, and blue) as described above, a color shift may occur in a color image. In response to this, it is conceivable to achromatize an edge portion of a character in an image read by a scanner, thereby eliminating a color shift in a sub-scanning direction. However, there is the possibility that achromatization is performed at any position in the image, and thus there is the possibility that achromatization is performed by mistake to cause a decrease in the image quality. Meanwhile, in an image reading device, when a document is automatically conveyed by using an automatic document feeder (ADF) and a color image on the document is read, the above-described color shift is likely to occur at a specific position in the direction of sub-scanning of the document image (i.e., the document conveyance direction) due to the mechanical configuration of a document conveying system. In response to this, the image processing apparatus according to the present disclosure permits achromatization only for a specific range in the direction of sub-scanning of a document image, thereby reducing the possibility that achromatization is performed by mistake to cause a decrease in image quality.

The image processing portion 2 performs color shift compensation on RGB signals inputted from the image reading portion 1. The image processing portion 2 includes a reception portion 21, an achromatization determination portion 22, an achromatization processing portion 23, a line designation portion 24, and a selector 25. It should be noted that the image processing portion 2 achieves these processing portions by using an ASIC (Application Specific Integrated Circuit) and/or hardware and/or software included in a computer.

The reception portion 21 receives RGB signals from the image reading portion 1.

The achromatization determination portion 22 determine whether to achromatize a target pixel in an image which is based on the RGB signals. Specifically, if a black pixel is present within a predetermined peripheral range from the target pixel in the sub-scanning direction, the achromatization determination portion 22 determines whether to achromatize the target pixel, on the basis of an attribute of a background determination pixel that is present in an opposite direction from the target pixel with respect to the black pixel and within a range of a predetermined number of pixels from the black pixel. In addition, if no black pixel is present within the predetermined peripheral range from the target pixel in the sub-scanning direction, the achromatization determination portion 22 determines not to achromatize the target pixel.

In this embodiment, more specifically, the achromatization determination portion 22 determines the attribute of the background determination pixel, and determines whether to achromatize the target pixel, in accordance with the attribute of the background determination pixel as follows.

If the saturation of the background determination pixel is within a predetermined first range, the achromatization determination portion 22 determines that the attribute of the background determination pixel is an achromatic color. In addition, if the saturation of the background determination pixel is within a predetermined second range, the achromatization determination portion 22 determines that the attribute of the background determination pixel is a chromatic color. It should be noted that the first range is a range equal to or lower than a predetermined threshold Th1, and the second range is a range equal to or higher than a predetermined threshold Th2. The threshold Th1 and the threshold Th2 may be the same, or the threshold Th1 may be lower than the threshold Th2.

If the achromatization determination portion 22 has determined that the attribute of the background determination pixel is black, the achromatization determination portion 22 determines whether to achromatize the target pixel, in accordance with a predetermined set value which is set by a user.

If the achromatization determination portion 22 has determined that the attribute of the background determination pixel is an achromatic color, the achromatization determination portion 22 determines to achromatize the target pixel.

If the achromatization determination portion 22 has determined that the attribute of the background determination pixel is a chromatic color, the achromatization determination portion 22 determines whether to achromatize the target pixel, in accordance with a hue difference between the target pixel and the background determination pixel. Here, if the hue difference is equal to or higher than a predetermined threshold, the achromatization determination portion 22 achromatizes the target pixel. If the hue difference is not equal to or higher than the predetermined threshold, the achromatization determination portion 22 does not achromatize the target pixel.

It should be noted that if the achromatization determination portion 22 has determined that the attribute of the background determination pixel is a chromatic color, the achromatization determination portion 22 may determine whether to achromatize the target pixel, in accordance with a predetermined set value when the hue difference between the target pixel and the background determination pixel is equal to or higher than the predetermined threshold.

If the achromatization determination portion 22 has determined that the attribute of the background determination pixel is not any of black, an achromatic color, and a chromatic color, the achromatization determination portion 22 does not achromatize the target pixel.

It should be noted that if an attribute of the target pixel is black, the achromatization determination portion 22 determines not to achromatize the target pixel, regardless of the attribute of the background determination pixel. In other words, if the attribute of the target pixel is black, the achromatization determination portion 22 does not perform a process of identifying the attribute of the background determination pixel (calculation of a saturation, etc.).

The achromatization determination portion 22 includes an attribute determination portion 31 and a pattern matching portion 32.

The attribute determination portion 31 determines an attribute of each pixel. On the basis of RGB values of each pixel, the attribute determination portion 31 determines whether the attribute of the pixel is black, an achromatic color (other than black), a chromatic color, or anything other than those. Specifically, if the RGB values of the pixel are (Ir, Ig, Ib), the attribute determination portion 31 identifies a maximum value Imax among Ir, Ig, and Ib and a minimum value Imin among Ir, Ig, and Ib. Then, if (Imax−Imin)≤first threshold and Imax≤second threshold on the basis of the maximum value Imax and the minimum value Imin, the attribute determination portion 31 determines that the attribute of the pixel is black. In addition, if the saturation of the pixel is within the predetermined first range, the attribute determination portion 31 determines that the attribute of the pixel is an achromatic color (other than black). Furthermore, if the saturation of the pixel is within the predetermined second range, the attribute determination portion 31 determines that the attribute of the pixel is a chromatic color. Moreover, if the saturation of the pixel is other than the above, the attribute determination portion 31 determines that the attribute of the pixel is "anything other than those".

The pattern matching portion 32 determines whether a black pixel is present within the predetermined peripheral range from the target pixel in the sub-scanning direction, by pattern matching, and determines whether to achromatize the target pixel, on the basis of the attribute of the background determination pixel.

Figure 2:
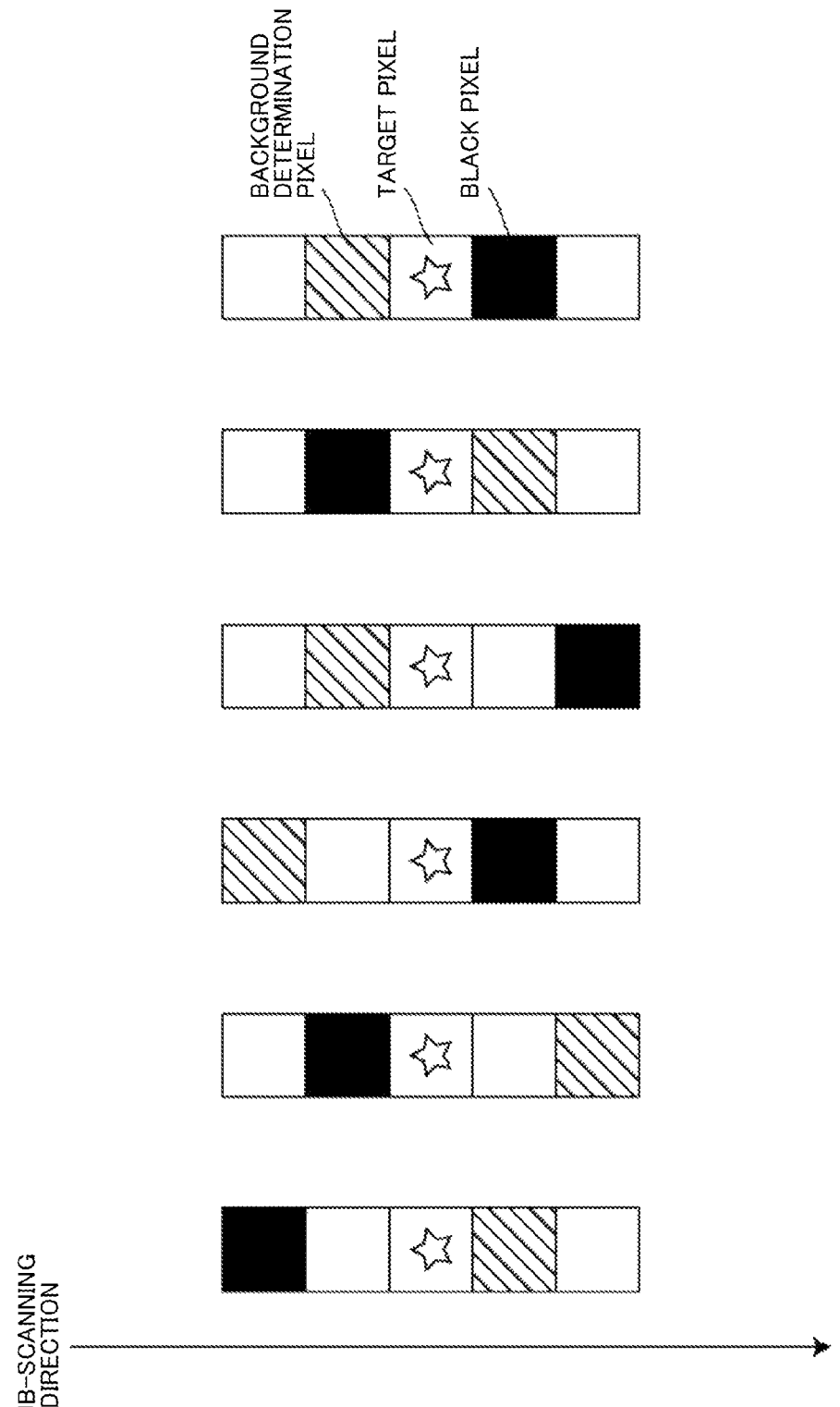
FIG. 2 is a diagram showing an example of patterns used by a pattern matching portion in FIG. 1.

FIG. 2 is a diagram showing an example of patterns used by the pattern matching portion 32 in FIG. 1.

In the example shown in FIG. 2, the pattern matching portion 32 identifies whether a black pixel is present within a peripheral range of two pixels from the target pixel in the sub-scanning direction.

If the pattern matching portion 32 has determined that a black pixel is present within the peripheral range of two pixels from the target pixel in the sub-scanning direction, the pattern matching portion 32 sets, as a background determination pixel, a pixel that is present in an opposite direction from the target pixel with respect to the black pixel and within a range of three pixels from the black pixel as shown in FIG. 2, and identifies an attribute of the background determination pixel.

If the pattern matching portion 32 has determined that no black pixel is present within the peripheral range of two pixels from the target pixel in the sub-scanning direction, the pattern matching portion 32 determines not to achromatize the target pixel. The pattern matching portion 32 determines whether to achromatize the target pixel, on the basis of the attribute of the background determination pixel as described above.

In addition, the achromatization processing portion 23 achromatizes the target pixel that is determined to achromatize by the achromatization determination portion 22, and does not achromatize the target pixel that is determined not to achromatize by the achromatization determination portion 22.

Specifically, the achromatization processing portion 23 includes an achromatization portion 33 and a selector 34. The achromatization processing portion 23 achromatizes each pixel by the achromatization portion 33. For the target pixel that is determined to achromatize by the achromatization determination portion 22, the achromatization processing portion 23 selects the RGB signal resulting from the achromatization from among the RGB signal resulting from the achromatization and the original RGB signal, and outputs the RGB signal resulting from the achromatization. In addition, for the target pixel that is determined not to achromatize by the achromatization determination portion 22, the achromatization processing portion 23 selects and outputs the original RGB signal.

The line designation portion 24 permits achromatization by the achromatization determination portion 22 and the achromatization processing portion 23 for lines within a predetermined partial range in the sub-scanning direction in the image which is based on the RGB signals from the image reading portion 1. In addition, the line designation portion 24 does not permit achromatization by the achromatization determination portion 22 and the achromatization processing portion 23 for lines that are out of the partial range.

Figure 3:
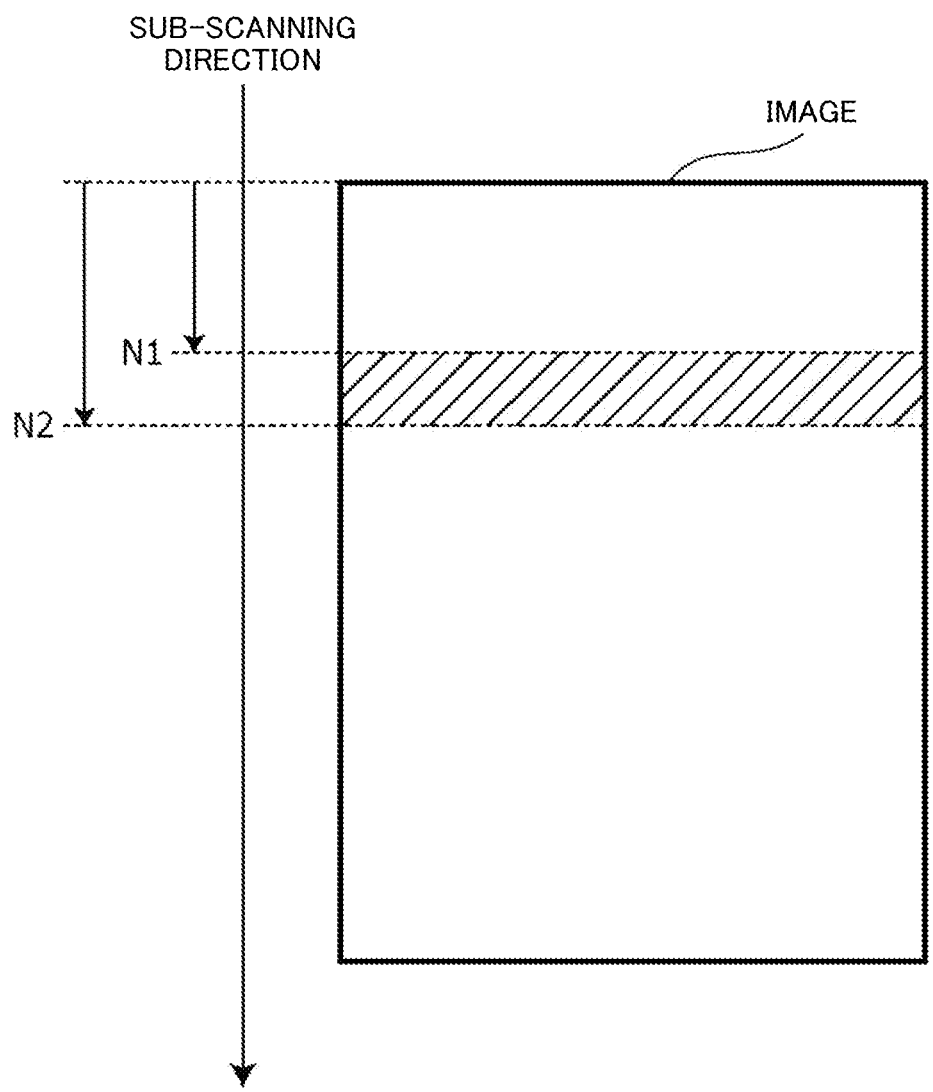
FIG. 3 is a diagram illustrating a line range designated by a line designation portion in FIG. 1.

FIG. 3 is a diagram illustrating a line range designated by the line designation portion 24 in FIG. 1.

In the case of automatically conveying a document by using the ADF 11 and reading a color image on the document, a color shift is likely to occur at a specific position in the direction of sub-scanning of the document image (i.e., the document conveyance direction) due to the mechanical configuration of the document conveying system.

Thus, a line range (N1 to N2) including a position in the sub-scanning direction within the document image which position corresponds to a specific position on the document (a position in the document conveyance direction) at which a color shift is likely to occur due to the mechanical configuration of the document conveying system, is set by the line designation portion 24 as shown in FIG. 3. For the pixels in each line from the N1th line to the N2th line in the image which is based on the RGB signals from the image reading portion 1, the line designation portion 24 causes the selector 25 to select and output the RGB signals from the achromatization processing portion 23. For the other pixels, the line designation portion 24 causes the selector 25 to select and output the original RGB signals.

Next, an operation of the image processing apparatus will be described.

While conveying a document by using the ADF 11, the image reading portion 1 reads a document image on a line-by-line basis by using the respective line sensors for R, G, and B, and outputs RGB signals of each line to the image processing portion 2.

In the image processing portion 2, the reception portion 21 receives the RGB signals. The achromatization determination portion 22 and the achromatization processing portion 23 sequentially select a target pixel in the received RGB signals and output the RGB signal for the target pixel.

In the achromatization determination portion 22, the attribute determination portion 31 determines an attribute of each pixel, and, as described above, the pattern matching portion 32 determines whether to achromatize the target pixel, on the basis of the attributes of the target pixel and the background determination pixel, and controls the selector 34 on the basis of the determination result.

In the achromatization processing portion 23, in accordance with the control by the pattern matching portion 32, the selector 34 outputs either one of the original RGB signal or the achromatized RGB signal for the target pixel to the selector 25.

Meanwhile, the line designation portion 24 counts the lines of the received RGB signals from the front of the document image, and causes the selector 25 to select the RGB signals in a range other than the predetermined line range (the above-described N1 to N2). In addition, the line designation portion 24 causes the selector 25 to select the RGB signals from the achromatization processing portion 23, in the predetermined line range (the above-described N1 to N2).

As described above, according to Embodiment 1 described above, the achromatization determination portion 22 determines whether to achromatize the target pixel in the image. In addition, if a black pixel is present in the predetermined peripheral range from the target pixel in the sub-scanning direction, the achromatization determination portion 22 determines whether to achromatize the target pixel, on the basis of the attribute of the background determination pixel. The achromatization processing portion 23 achromatizes the target pixel that is determined to achromatize by the achromatization determination portion 22. The line designation portion 24 permits achromatization by the achromatization determination portion 22 and the achromatization processing portion 23 for the lines within the predetermined partial range in the sub-scanning direction in the image, and does not permit achromatization by the achromatization determination portion 22 and the achromatization processing portion 23 for the lines that are out of the partial range.

Thus, achromatization is prohibited for a portion where the possibility of occurrence of a color shift is low, and hence the possibility is reduced that achromatization is performed by mistake to cause a decrease in image quality.

In addition, in Embodiment 1 described above, since achromatization is performed in accordance with the saturation of the background determination pixel, even if the background color of the image is a color other than white, the target pixel is appropriately achromatized. Moreover, the background of the image is not achromatized.

Embodiment 2

Figure 4:
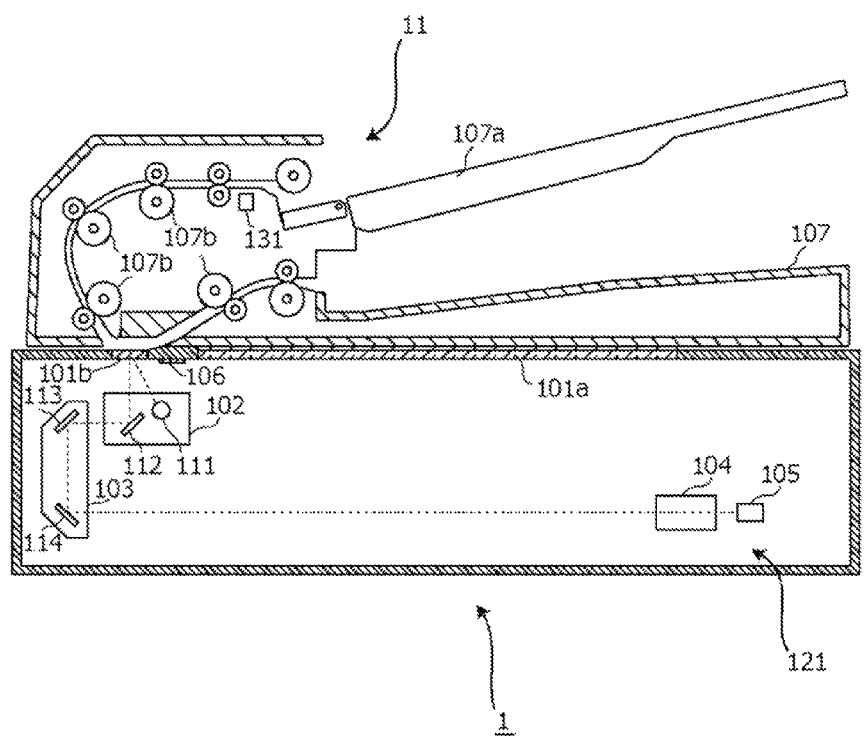
FIG. 4 is a side view showing the internal configuration of an image reading portion 1 in an image processing apparatus according to Embodiment 2 of the present disclosure.

An image processing apparatus according to Embodiment 2 of the present disclosure achromatizes a portion where a color shift occurs in a main-scanning direction, when a document is curled in the main-scanning direction. FIG. 4 is a side view showing the internal configuration of an image reading portion 1 in the image processing apparatus according to Embodiment 2 of the present disclosure. The image reading portion 1 shown in FIG. 4 includes contact glasses 101a and 101b, carriages 102 and 103, an imaging lens 104, an image sensor 105, a white reference patch 106, a document cover 107, and an ADF 11.

The contact glass 101a is provided on the upper surface of a main body of the image processing apparatus, and a document is placed thereon in the case of performing image reading without using the ADF 11 of the document cover 107. In addition, the contact glass 101b is provided on the upper surface of the main body of the image processing apparatus, and a document passes above the contact glass 101b in performing image reading while automatically conveying the document by using the ADF 11 of the document cover 107. The ADF 11 passes the document such that the document passes above the contact glass 101b, and an image reading mechanism 121 reads an image on the document passing above the contact glass 101b.

In the image reading mechanism 121, the carriage 102 is provided so as to be movable in the sub-scanning direction by a driving source which is not shown. The carriage 102 includes a light source 111 and a mirror 112. The light source 111 is disposed along the main-scanning direction, and emits light, for example, by a plurality of arranged light-emitting diodes. The light emitted from the light source 111 is reflected on a document placed on the contact glass 101a, a document passing above the contact glass 101b, or the like in accordance with the position of the carriage 102. The mirror 112 reflects reflected light from the document or the like. In the case of performing image reading on a document by using the ADF 11 of the document cover 107, the carriage 102 is fixedly disposed below the contact glass 101b.

In addition, the carriage 103 is provided so as to be movable in the sub-scanning direction together with the carriage 102 by a driving source which is not shown. The carriage 103 includes mirrors 113 and 114. The mirrors 113 and 114 reflect light from the mirror 112 of the carriage 102 and emit the light along the sub-scanning direction.

The imaging lens 104 causes the light from the mirror 114 to form an image on the image sensor 105. The image sensor 105 is a one-dimensional image sensor which includes light receiving elements arranged in the main-scanning direction and having a predetermined number of pixels. For each line, the image sensor 105 outputs an electrical signal corresponding to an amount of light received at each pixel of the number of pixels. As the image sensor 105, for example, a CCD (Charge Coupled Device) is used.

The white reference patch 106 is disposed on a ceiling surface within the apparatus and is a plate-shape member used for obtaining white reference data.

The document cover 107 is a member provided so as to be rotatable and surface-contactable with the contact glass 101a, brings a document into close contact with the contact glass 101a, and prevents the ambient light from entering the apparatus through the contact glass 101a in image reading. In addition, the document cover 107 includes the ADF 11, conveys documents placed on a document tray 107a, one by one by using conveying rollers 107b, and passes the documents above the contact glass 101b.

A sensor 131 is provided in the image reading portion 1, and detects curling of a document in the main-scanning direction. The sensor 131 is provided on a document conveyance path, and includes a plurality of distance sensors arranged along the main-scanning direction (i.e., a direction perpendicular to the conveyance direction). If the distance to a document detected by the distance sensors is lengthened or shortened as distance from the center increases in the main-scanning direction, it is determined that the document is curled.

Figure 5:
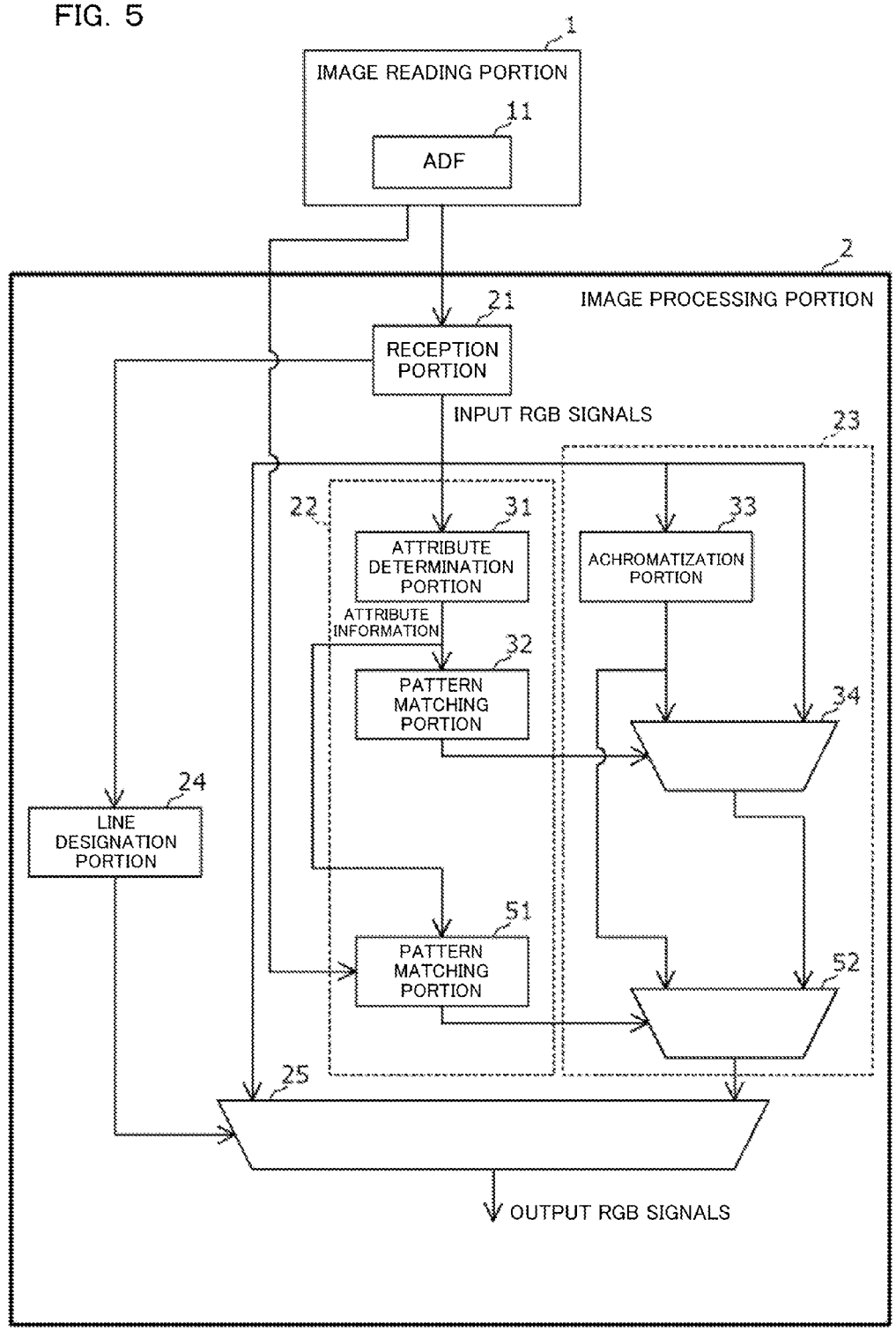
FIG. 5 is a block diagram showing the configuration of the image processing apparatus according to Embodiment 2 of the present disclosure.

FIG. 5 is a block diagram showing the configuration of the image processing apparatus according to Embodiment 2 of the present disclosure. As shown in FIG. 5, in Embodiment 2, the achromatization determination portion 22 further includes a pattern matching portion 51, and the achromatization processing portion 23 further includes a selector 52.

In Embodiment 2, when curling of a document is detected by the sensor 131: if a black pixel is present in a predetermined peripheral range from a target pixel in the main-scanning direction, the achromatization determination portion 22 determines whether to achromatize the target pixel, on the basis of an attribute of a background determination pixel that is present in an opposite direction from the target pixel with respect to the black pixel and within a range of a predetermined number of pixels from the black pixel; and if no black pixel is present in the predetermined peripheral range from the target pixel in the main-scanning direction, the achromatization determination portion 22 determines not to achromatize the target pixel.

Figure 6:
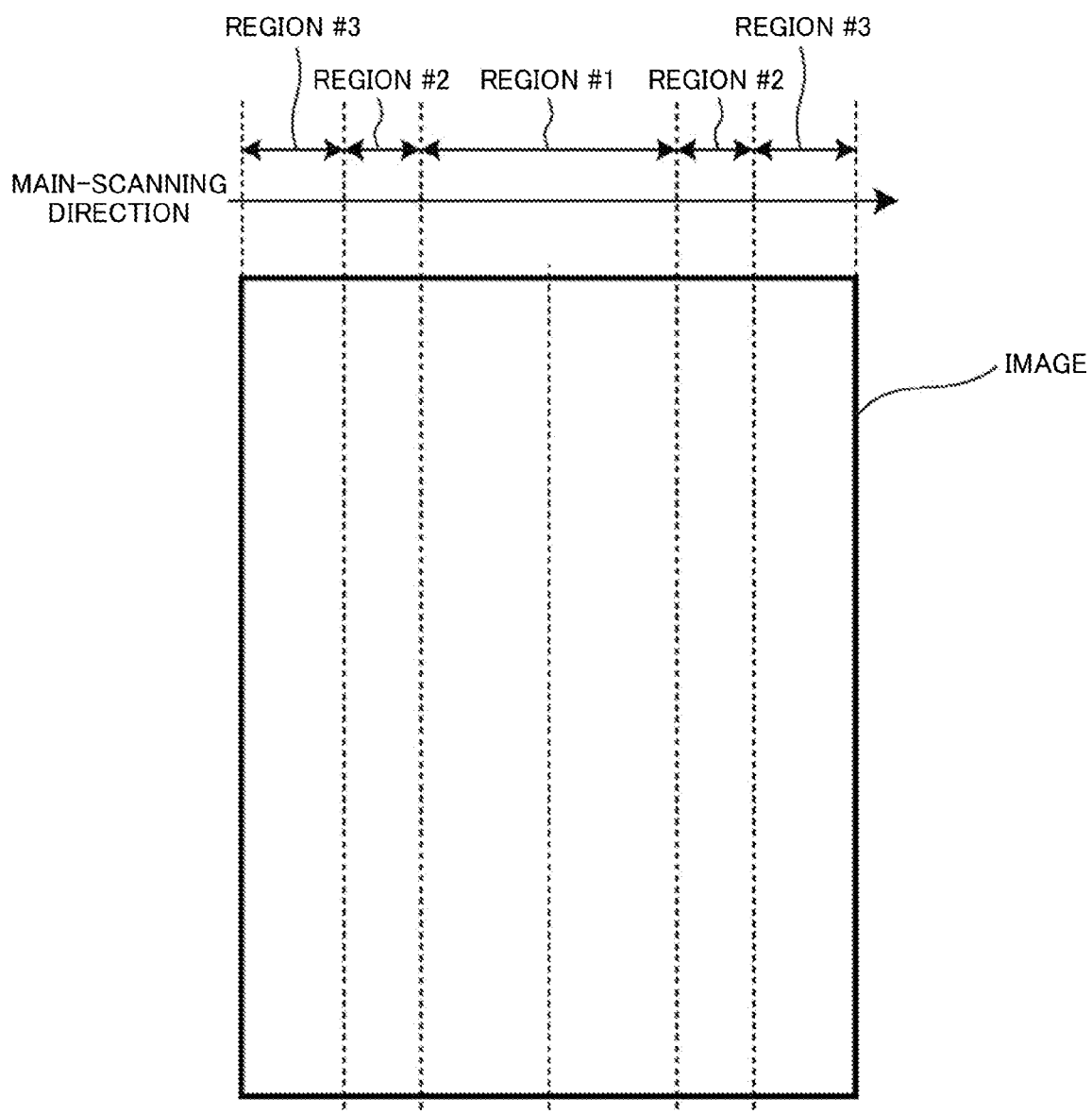
FIG. 6 is a diagram for explaining a process of an achromatization determination portion in Embodiment 2 of the present disclosure.

FIG. 6 is a diagram for explaining a process of the achromatization determination portion 22 in Embodiment 2.

Furthermore, in Embodiment 2, the achromatization determination portion 22 performs the following determinations (a), (b), and (c).

(a) For pixels within a region #1 which is a center portion of the image in the main-scanning direction, the achromatization determination portion 22 determines not to perform achromatization for corresponding to curling of a document, on a target pixel.

(b) For pixels within regions #2 at the outer sides of the region #1 in the main-scanning direction, if a black pixel is present within a first peripheral range from a target pixel (here, within one pixel from the target pixel) in the main-scanning direction, the achromatization determination portion 22 determines whether to achromatize the target pixel, on the basis of an attribute of a background determination pixel that is present in an opposite direction from the target pixel with respect to the black pixel and within a range of a first number of pixels (here, two pixels) from the black pixel. In addition, if no black pixel is present within the first peripheral range from the target pixel in the main-scanning direction, the achromatization determination portion 22 determines not to perform achromatization for corresponding to curling of a document, on the target pixel.

(c) For pixels within regions #3 at the outer sides of the regions #2 in the main-scanning direction, if a black pixel is present within a second peripheral range, which is wider than the first peripheral range, from a target pixel (here, within two pixels from the target pixel) in the main-scanning direction, the achromatization determination portion 22 determines whether to achromatize the target pixel, on the basis of an attribute of a background determination pixel that is present in an opposite direction from the target pixel with respect to the black pixel and within a range of a second number of pixels, which is larger than the first number of pixels, (here, three pixels) from the black pixel. In addition, if no black pixel is present within the second peripheral range from the target pixel in the main-scanning direction, the achromatization determination portion 22 determines not to perform achromatization for corresponding to curling of a document, on the target pixel.

Specifically, the pattern matching portion 51 of the achromatization determination portion 22 performs the above-described process through pattern matching similar to that of the pattern matching portion 32 with respect to the main-scanning direction by using patterns different between the regions #2 and the regions #3.

Figure 7:
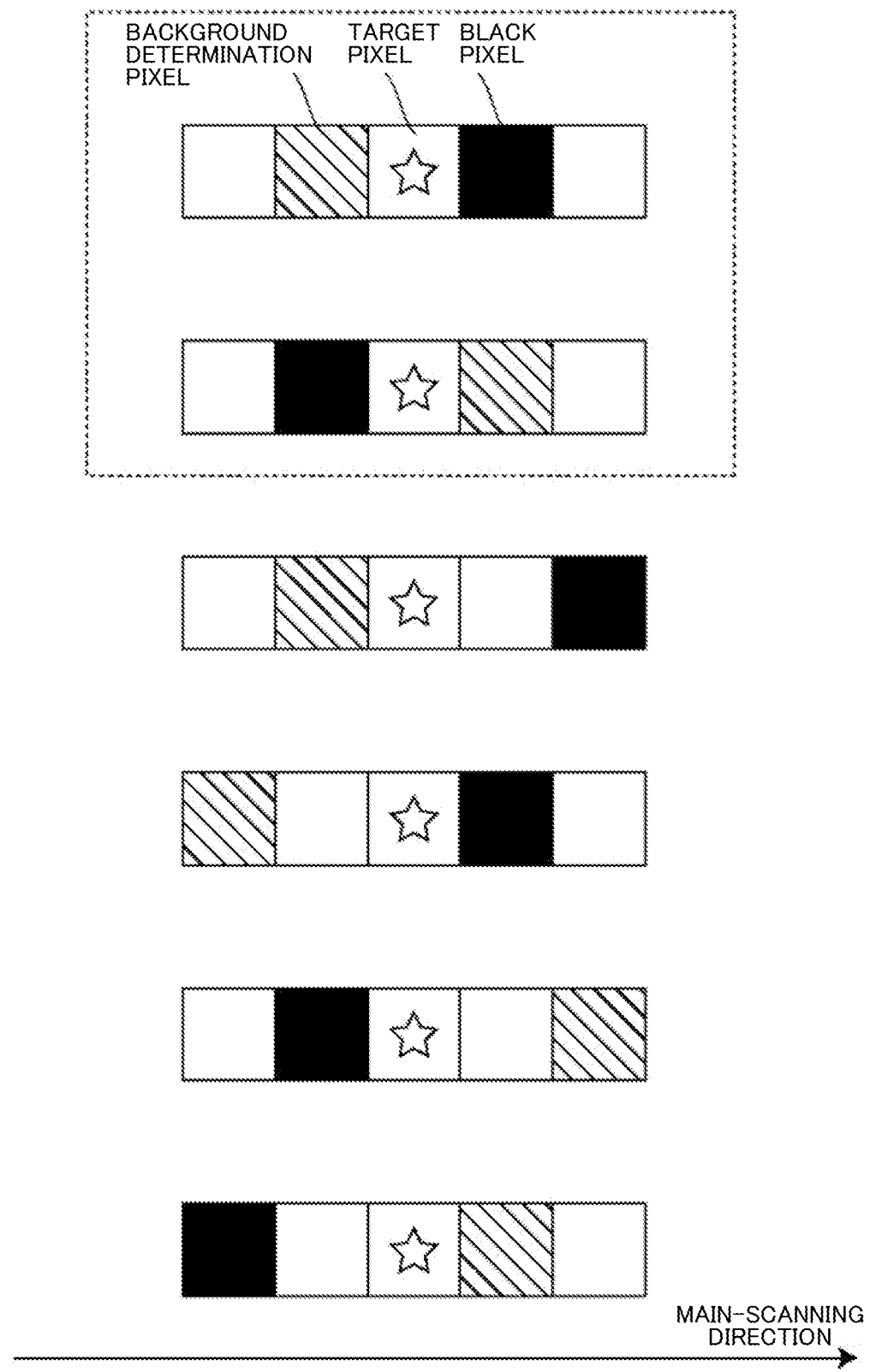
FIG. 7 is a diagram showing an example of patterns used by a pattern matching portion in Embodiment 2 of the present disclosure.

FIG. 7 is a diagram showing an example of patterns used by the pattern matching portion 51 in Embodiment 2. For the regions #2, the pattern matching portion 51 uses two patterns within a broken line shown in FIG. 7, to identify whether a black pixel is present within a peripheral range of one pixel from the target pixel in the main-scanning direction. For the regions #3, the pattern matching portion 51 uses all the patterns shown in FIG. 7, to identify whether a black pixel is present within a peripheral range of two pixels from the target pixel in the main-scanning direction.

The selector 52 selects output of the achromatization portion 33 if the pattern matching portion 51 determines to achromatize the target pixel, selects output of the selector 34 if the pattern matching portion 51 determines not to achromatize the target pixel, and outputs the selected value to the selector 25.

It should be noted that the other configuration and operation of the image processing apparatus according to Embodiment 2 are the same as those of Embodiment 1, and the description thereof is omitted.

As described above, according to Embodiment 2 described above, when a document has been curled, if a color shift has occurred in the main-scanning direction, it is possible to achromatize a portion where the color shift has occurred. In addition, since achromatization is prohibited for a portion where the possibility of occurrence of a color shift is low, the possibility is reduced that achromatization is performed by mistake to cause a decrease in image quality. Furthermore, since achromatization is performed in accordance with the saturation of the background determination pixel, even if the background color of the image is a color other than white, the target pixel is appropriately achromatized. Moreover, the background of the image is not achromatized.

It should be noted that each embodiment described above is a preferred example of the present disclosure, but the present disclosure is not limited to them and various modifications and changes may be made without departing from the scope of the present disclosure.

The present disclosure is applicable to color image forming apparatuses such as a scanner, a copy machine, a multifunction peripheral, and the like including an automatic document feeder.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
    an achromatization determination portion configured to determine whether to achromatize a target pixel in an image;
    an achromatization processing portion configured: to achromatize the target pixel that is determined to achromatize by the achromatization determination portion; and not to achromatize the target pixel that is determined not to achromatize by the achromatization determination portion; and
    a line designation portion configured: to permit achromatization by the achromatization determination portion and the achromatization processing portion for a line within a predetermined partial range in a sub-scanning direction in the image; and not to permit achromatization by the achromatization determination portion and the achromatization processing portion for a line that is out of the partial range in the sub-scanning direction in the image, wherein
    if a black pixel is present within a predetermined peripheral range from the target pixel in the sub-scanning direction, the achromatization determination portion determines whether to achromatize the target pixel, on the basis of an attribute of a background determination pixel that is present in an opposite direction from the target pixel with respect to the black pixel and within a range of a predetermined number of pixels from the black pixel, and
    if no black pixel is present within the predetermined peripheral range from the target pixel in the sub-scanning direction, the achromatization determination portion determines not to achromatize the target pixel.

2. The image processing apparatus according to claim 1, wherein the achromatization determination portion determines the attribute of the background determination pixel, and determines whether to achromatize the target pixel, in accordance with a predetermined set value if the achromatization determination portion has determined that the attribute of the background determination pixel is black.

3. The image processing apparatus according to claim 1, wherein
    if a saturation of the background determination pixel is within a predetermined first range, the achromatization determination portion determines that the attribute of the background determination pixel is an achromatic color, and
    if the achromatization determination portion has determined that the attribute of the background determination pixel is an achromatic color, the achromatization determination portion determines to achromatize the target pixel.

4. The image processing apparatus according to claim 1, wherein
    if a saturation of the background determination pixel is within a predetermined second range, the achromatization determination portion determines that the attribute of the background determination pixel is a chromatic color, and
    if the achromatization determination portion has determined that the attribute of the background determination pixel is a chromatic color, the achromatization determination portion determines whether to achromatize the target pixel, in accordance with a hue difference between the target pixel and the background determination pixel.

5. The image processing apparatus according to claim 1, wherein
    if a saturation of the background determination pixel is within a predetermined second range, the achromatization determination portion determines that the attribute of the background determination pixel is a chromatic color, and
    if the achromatization determination portion has determined that the attribute of the background determination pixel is a chromatic color, the achromatization determination portion determines whether to achromatize the target pixel, in accordance with a predetermined set value when a hue difference between the target pixel and the background determination pixel is equal to or higher than a predetermined threshold.

6. The image processing apparatus according to claim 1, wherein
    if a saturation of the background determination pixel is within a predetermined first range, the achromatization determination portion determines that the attribute of the background determination pixel is an achromatic color, if the saturation of the background determination pixel is within a predetermined second range, the achromatization determination portion determines that the attribute of the background determination pixel is a chromatic color, and if the achromatization determination portion has determined that the attribute of the background determination pixel is not any of black, an achromatic color, and a chromatic color, the achromatization determination portion determines not to achromatize the target pixel.

7. The image processing apparatus according to claim 1, wherein if an attribute of the target pixel is black, the achromatization determination portion determines not to achromatize the target pixel, regardless of the attribute of the background determination pixel.

8. The image processing apparatus according to claim 1, further comprising an image reading portion configured to read the image from a document while automatically conveying the document.

9. The image processing apparatus according to claim 8, further comprising a sensor provided in the image reading portion and configured to detect curling of the document in a main-scanning direction, wherein when curling of the document is detected by the sensor, if a black pixel is present within a predetermined peripheral range from the target pixel in the main-scanning direction, the achromatization determination portion determines whether to achromatize the target pixel, on the basis of an attribute of a background determination pixel that is present in an opposite direction from the target pixel with respect to the black pixel and within a range of a predetermined number of pixels from the black pixel.

10. The image processing apparatus according to claim 9, wherein (a) for pixels within a second region at an outer side of a first region which is a center portion of the image in the main-scanning direction, if a black pixel is present within a first peripheral range from the target pixel in the main-scanning direction, the achromatization determination portion determines whether to achromatize the target pixel, on the basis of an attribute of a background determination pixel that is present in an opposite direction from the target pixel with respect to the black pixel and within a range of a first number of pixels from the black pixel, and (b) for pixels within a third region at an outer side of the second region in the main-scanning direction, if a black pixel is present within a second peripheral range, which is wider than the first peripheral range, from the target pixel in the main-scanning direction, the achromatization determination portion determines whether to achromatize the target pixel, on the basis of an attribute of a background determination pixel that is present in an opposite direction from the target pixel with respect to the black pixel and within a range of a second number of pixels, which is larger than the first number of pixels, from the black pixel.

11. An image processing method comprising:

a first step of determining whether to achromatize a target pixel in an image;

a second step of: achromatizing the target pixel that is determined to achromatize in the first step; and not achromatizing the target pixel that is determined not to achromatize in the first step; and a third step of: permitting achromatization in the first step and the second step for a line within a predetermined partial range in a sub-scanning direction in the image; and not permitting achromatization in the first step and the second step for a line that is out of the partial range in the sub-scanning direction in the image, wherein the first step includes a step of, if a black pixel is present within a predetermined peripheral range from the target pixel in the sub-scanning direction, determining whether to achromatize the target pixel, on the basis of an attribute of a background determination pixel that is present in an opposite direction from the target pixel with respect to the black pixel and within a range of a predetermined number of pixels from the black pixel, and if no black pixel is present within the predetermined peripheral range from the target pixel in the sub-scanning direction, it is determined in the first step not to achromatize the target pixel.

12. The image processing method according to claim 11, wherein the first step includes: a step of determining the attribute of the background determination pixel; and a step of determining whether to achromatize the target pixel, in accordance with a predetermined set value if it has been determined in the first step that the attribute of the background determination pixel is black.

13. The image processing method according to claim 11, wherein if a saturation of the background determination pixel is within a predetermined first range, it is determined in the first step that the attribute of the background determination pixel is an achromatic color, and if it has been determined in the first step that the attribute of the background determination pixel is an achromatic color, it is determined in the first step to achromatize the target pixel.

14. The image processing method according to claim 11, wherein if a saturation of the background determination pixel is within a predetermined second range, it is determined in the first step that the attribute of the background determination pixel is a chromatic color, and the first step includes a step of, if it has been determined in the first step that the attribute of the background determination pixel is a chromatic color, determining whether to achromatize the target pixel, in accordance with a hue difference between the target pixel and the background determination pixel.

15. The image processing method according to claim 11, wherein if a saturation of the background determination pixel is within a predetermined second range, it is determined in the first step that the attribute of the background determination pixel is a chromatic color, and the first step includes a step of, if it has been determined in the first step that the attribute of the background determination pixel is a chromatic color, determining whether to achromatize the target pixel, in accordance with a predetermined set value when a hue difference between the target pixel and the background determination pixel is equal to or higher than a predetermined threshold.

16. The image processing method according to claim 11, wherein if a saturation of the background determination pixel is within a predetermined first range, it is determined in the first step that the attribute of the background determination pixel is an achromatic color, if the saturation of the background determination pixel is within a predetermined second range, it is determined in the first step that the attribute of the background determination pixel is a chromatic color, and if it has been determined in the first step that the attribute of the background determination pixel is not any of black, an achromatic color, and a chromatic color, it is determined in the first step not to achromatize the target pixel.

17. The image processing method according to claim 11, wherein if an attribute of the target pixel is black, it is determined in the first step not to achromatize the target pixel, regardless of the attribute of the background determination pixel.

18. The image processing method according to claim 11, wherein the image processing method is executed in an image processing apparatus including an image reading portion configured to read the image from a document while automatically conveying the document.

19. The image processing method according to claim 18, wherein the image processing method is executed in the image processing apparatus further including a sensor provided in the image reading portion and configured to detect curling of the document in a main-scanning direction, wherein the first step includes a step of, when curling of the document is detected by the sensor, if a black pixel is present within a predetermined peripheral range from the target pixel in the main-scanning direction, determining whether to achromatize the target pixel, on the basis of an attribute of a background determination pixel that is present in an opposite direction from the target pixel with respect to the black pixel and within a range of a predetermined number of pixels from the black pixel.

20. The image processing method according to claim 19, wherein the first step includes:

(a) a step of, for pixels within a second region at an outer side of a first region which is a center portion of the image in the main-scanning direction, if a black pixel is present within a first peripheral range from the target pixel in the main-scanning direction, determining whether to achromatize the target pixel, on the basis of an attribute of a background determination pixel that is present in an opposite direction from the target pixel with respect to the black pixel and within a range of a first number of pixels from the black pixel, and (b) a step of, for pixels within a third region at an outer side of the second region in the main-scanning direction, if a black pixel is present within a second peripheral range, which is wider than the first peripheral range, from the target pixel in the main-scanning direction, determining whether to achromatize the target pixel, on the basis of an attribute of a background determination pixel that is present in an opposite direction from the target pixel with respect to the black pixel and within a range of a second number of pixels, which is larger than the first number of pixels, from the black pixel.

* * * * *